(12) United States Patent
Lucchi et al.

(10) Patent No.: US 7,360,644 B1
(45) Date of Patent: Apr. 22, 2008

(54) MODULAR BELT WITH RODLESS HINGE

(75) Inventors: Marco Lucchi, Muenchestein (CH); Dietmar Elsner, Eimeldingen (DE)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 11/728,113

(22) Filed: Mar. 23, 2007

(51) Int. Cl.
*B65G 17/06* (2006.01)

(52) U.S. Cl. ......................... 198/853; 198/850; 198/852

(58) Field of Classification Search ......... 198/850–853
See application file for complete search history.

(56) References Cited

U.S. PATENT DOCUMENTS

| | | | |
|---|---|---|---|
| 2,009,157 A | 7/1935 | Zilles et al. | |
| 2,695,095 A | 11/1954 | Anderson | |
| 3,415,136 A * | 12/1968 | Mojonnier | 474/212 |
| 3,628,834 A * | 12/1971 | Anderson | 305/159 |
| 4,394,901 A * | 7/1983 | Roinestad | 198/850 |
| 4,618,056 A | 10/1986 | Cutshall | |
| 4,815,271 A * | 3/1989 | Lapeyre | 59/84 |
| 4,882,901 A * | 11/1989 | Lapeyre | 59/84 |
| 5,520,585 A | 5/1996 | Green et al. | |
| 5,562,200 A | 10/1996 | Daringer | |
| D419,742 S * | 1/2000 | Abbestam | D34/29 |
| 6,347,699 B1 * | 2/2002 | Ramsey | 198/852 |
| 6,725,883 B2 * | 4/2004 | Guldenfels | 198/850 |
| 6,732,856 B2 * | 5/2004 | Maine, Jr. | 198/850 |
| 6,736,259 B1 * | 5/2004 | Funabashi | 198/852 |
| 6,871,736 B2 | 3/2005 | Fandella | |
| D528,259 S * | 9/2006 | Layne et al. | D34/29 |
| 2005/0067262 A1 | 3/2005 | Layne et al. | |
| 2005/0241924 A1 | 11/2005 | Damkjaer | |

FOREIGN PATENT DOCUMENTS

| | | |
|---|---|---|
| GB | 2282115 A | 3/1995 |
| WO | 97/28072 | 8/1997 |
| WO | 03/072464 A1 | 9/2003 |

* cited by examiner

*Primary Examiner*—Douglas A Hess
(74) *Attorney, Agent, or Firm*—Hodgson Russ LLP

(57) ABSTRACT

A rodless system for a modular conveying belt where the studs are inserted into the pivot opening by transversally shifting the module with the studs in relation to the module with the pivot opening.

20 Claims, 7 Drawing Sheets

MODULAR BELT WITH RODLESS HINGE

FIELD OF THE INVENTION

The present invention relates to modular belts for use in conveying systems.

BACKGROUND OF THE INVENTION

Modular belts are usually constructed from modules that are assembled in a bricklayed manner and hinged together with a pivot rod. A disadvantage of this design is the complexity of the assembly process, which is typically done manually. This complexity results in high assembly costs and an inventory needed for the large number of pivot rods.

Various attempts have been made to eliminate the pivot rods. The primary motivation for eliminating the pivot rods is to reduce cost. Most of the known rodless systems join the modules by clipped links. The clipped systems are sometimes promoted as being easier to assemble and easy to clean.

Most of the clipped systems use molded studs integrated into the link ends on one side of the module to act as a pivot pin. These studs are engaged (or snapped in) through a slotted link on the opposite side of the adjacent module and finally rest in the pivot bore. The slots or gaps, which are provided to introduce the studs into the link, may cause problems for cleaning. Residuals may be collected therein and are difficult to remove.

Accordingly, there is a need for a modular belt with a rodless hinge that overcomes the above mentioned shortcomings.

SUMMARY OF THE INVENTION

The present invention meets the above described need by providing a rodless system where the studs are inserted into the pivot opening by transversally shifting the module with the studs in relation to the module with the pivot bore.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1A:
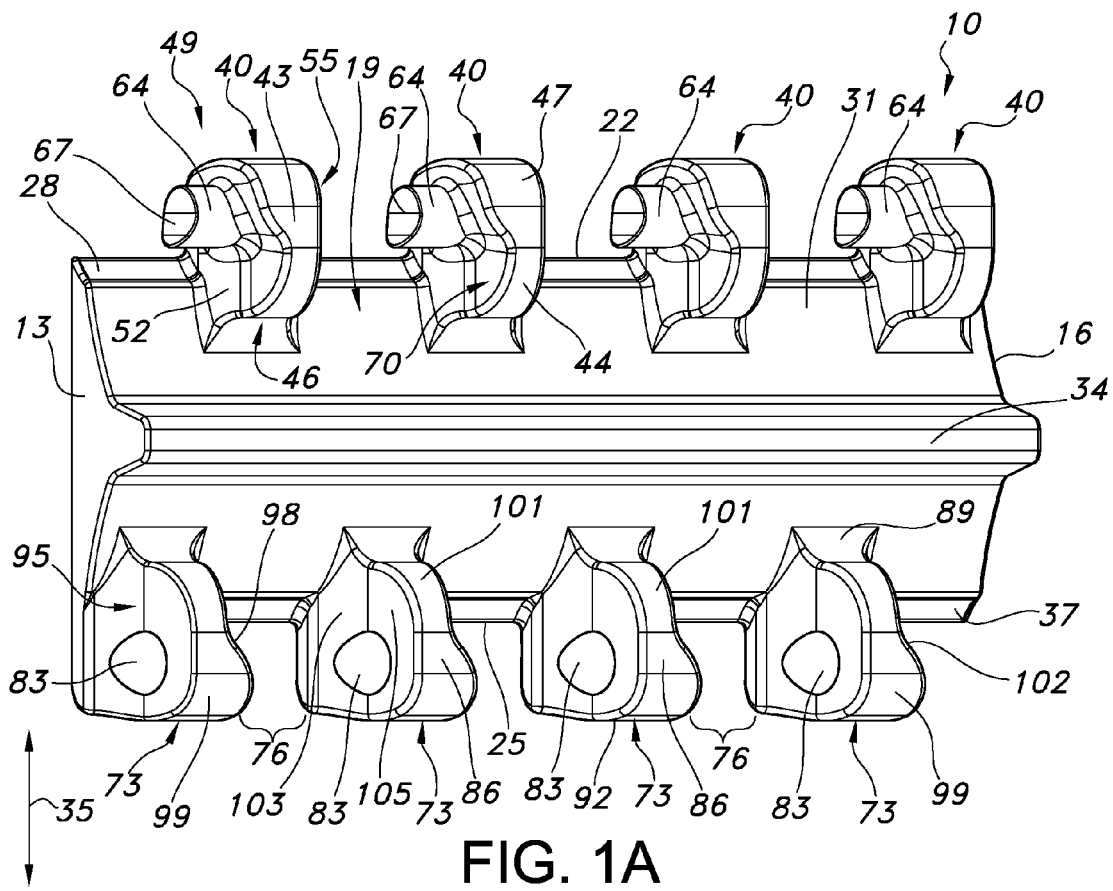
FIG. 1A is a bottom perspective view of a module according to the present invention.

Referring to FIGS. 1A-7 generally and initially to FIG. 1A, a belt module 10 has a first side edge 13 and a second side edge 16 disposed opposite from the first side edge 13. The module 10 has a bottom surface 19 that extends from a leading edge 22 to a trailing edge 25. The bottom surface 19 includes a first curved portion 28 extending from the leading edge 22 to a central portion 31. With respect to the orientation of FIG. 1A, a rib 34 extends upward from the central portion 31 between the first side edge 13 and the second side edge 16. The rib 34 extends transverse to the direction of belt travel indicated by arrow 35. The central portion 31 extends to a second curved portion 37 that extends to the trailing edge 25.

A first plurality of link ends 40 extend from the bottom surface 19 in the direction of belt travel. The link ends 40 have a bottom surface 43; end surfaces 46, 49; side surfaces 52, 55; and a top surface 58 (FIG. 2) that is coplanar with a top surface 61 of the module 10. Each of the link ends 40 has a stud 64 extending therefrom in the transverse direction. The stud 64 may be cylindrical and may have an angled face 67 at its distal end. As shown in FIG. 1A, the end surface 46 is narrower than end surface 49 and the bottom surface 43 has a thinner portion 44 adjacent end surface 46 and a wider portion 47 adjacent to end surface 49. Side surface 52 has a recessed portion 70.

A second plurality of link ends 73 extend from the bottom surface 19 in a direction opposite to the first link ends 40. The second link ends 73 have spaces 76 disposed between adjacent link ends 73. The link ends 73 are offset from link ends 40 such that the link ends 40 of an adjacent module 10 fit into the spaces 76 between link ends 73. By intercalating the link ends 40, 73 of adjacent modules 10 as shown in FIGS. 2-5, a belt 80 (FIG. 5) is formed. The belt 80 has a width that is formed by one module 10 in each row. The belt 80 could also be formed with multiple modules per row and assembled in bricklayed fashion as will be evident to those of ordinary skill in the art based on this disclosure.

Figure 1B:
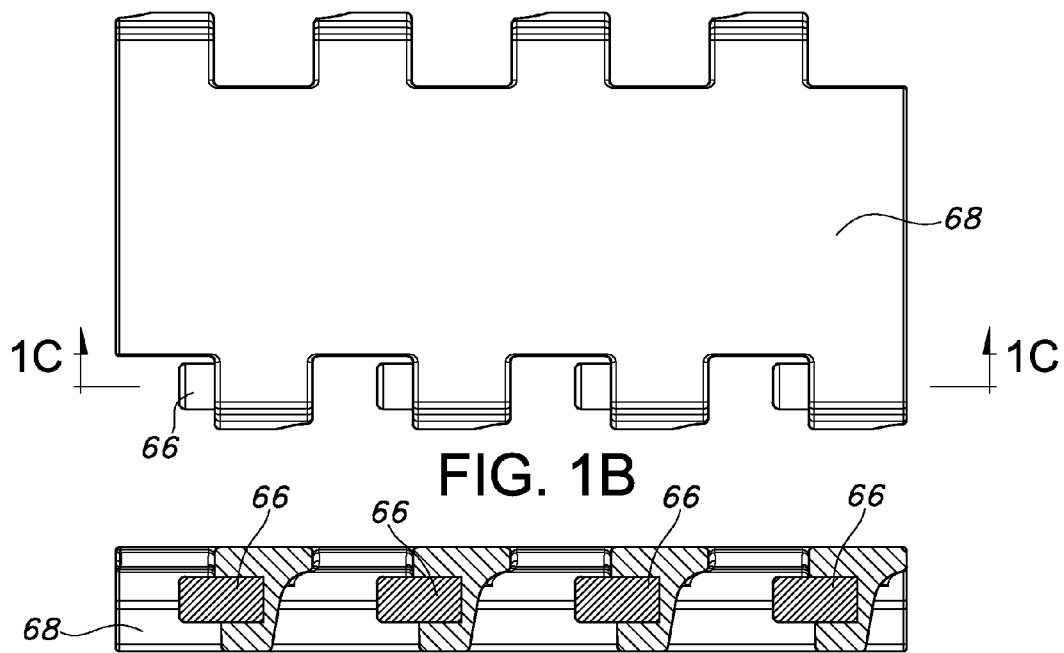
FIG. 1B is a top plan view of an alternate embodiment of the present invention.
Figure 1C:
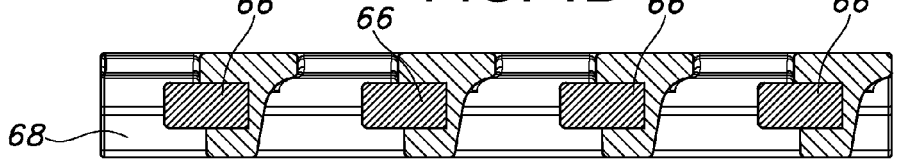
FIG. 1C is a cross-sectional view taken along lines 1C-1C of FIG. 1B.

Returning to FIG. 1A, the link ends 73 have openings 83 for receiving the studs 64 on adjacent link ends 40 when the modules 10 are intercalated as discussed in greater detail below. The second link ends 73 have a bottom surface 86; end surfaces 89, 92; and side surfaces 95,98. The bottom surface 86 has a wider portion 99 at the distal end and has a narrower portion 101 at the end that connects to the central portion 31. The side surface 95 curves inward around the opening 83. A first portion 103 extends inward and around opening 83 where it joins with a second portion 105. The module 10 may be molded in one piece from a plastic compound that is modified with additives to reduce friction and wear. For example, polytetrafluorethylene (TEFLON) may be added to the base plastic material. As an alternative and as shown in FIGS. 1B-1C, the module body and the studs may be made from different materials. Studs 66 are constructed of a different material and may be inlayed in the mold prior to the module 68 being molded.

Figure 2:
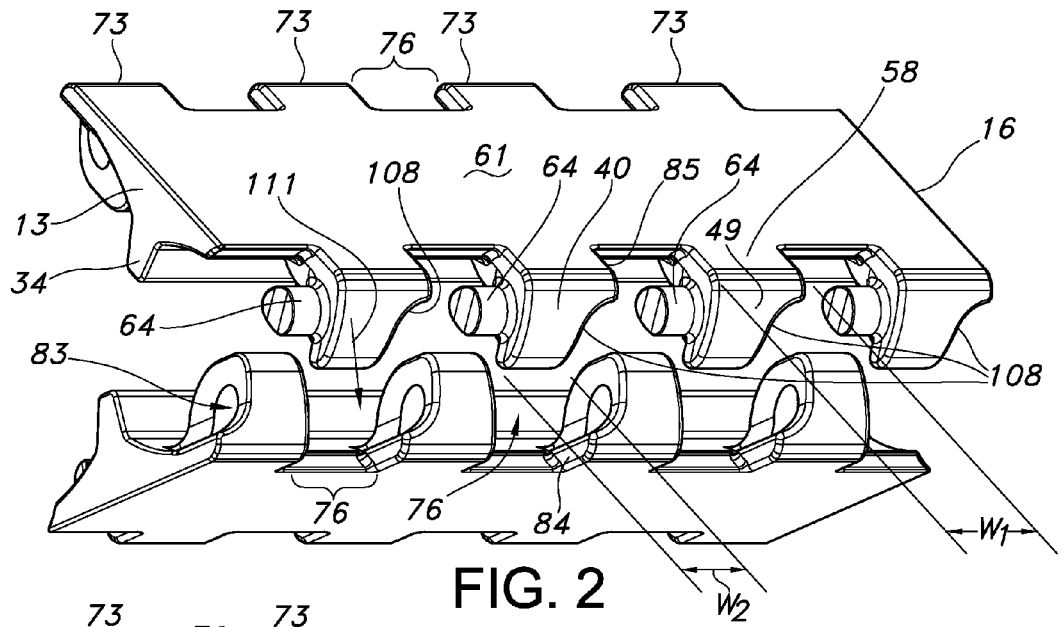
FIG. 2 is a perspective view of a pair of adjacent modules prior to the joining of the modules to form a belt.

Turning to FIG. 2, link end 40 has a first width W1 at the top surface 58. The link end 40 curves from the top surface 58 along the end surface 49. The end surface 49 becomes narrower on the right hand side (with respect to the orientation of FIG. 2) where an edge 108 curves inward. Accordingly, the width W2 at the bottom of the end surface 49 is less than width W1. On the opposite side of the link end 40, the stud 64 extends in the transverse direction. When the module 10 is angled with respect to the adjacent module 10 as shown in FIG. 2, the link end 40 and stud 64 can be inserted into the space 76 between the link ends 73 on the adjacent module 10. The curvature along the right hand edge 108 of link 40 provides clearance for inserting the link end 40 and stud 64 in the direction of arrow 111.

Figure 3:
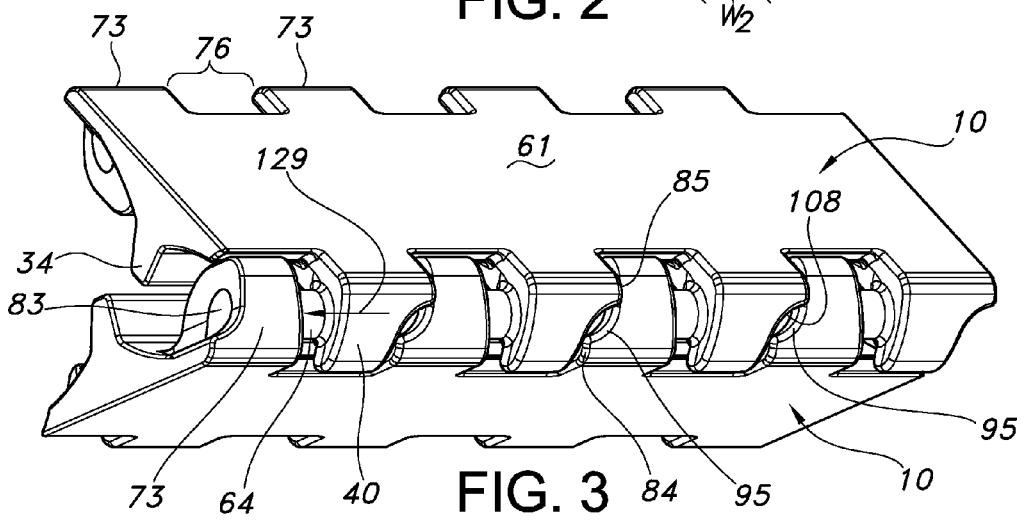
FIG. 3 is a perspective view of the modules of FIG. 2 in an intermediate step.

In FIG. 3, the next step of the assembly process is shown. The link end 40 is inserted into the space between adjacent link ends 73 until the stud 64 is aligned with the opening 83 in the link end 73. As shown, the curved edge 108 of the link end 40 nests with the curved side surface 95 of link end 73 to provide clearance for the stud 64. Once the stud 64 is aligned with the opening 83, the first module 10 is moved transversally with respect to the second module 10 in the direction of arrow 129 such that the stud 64 is received in the opening 83.

Figure 4:
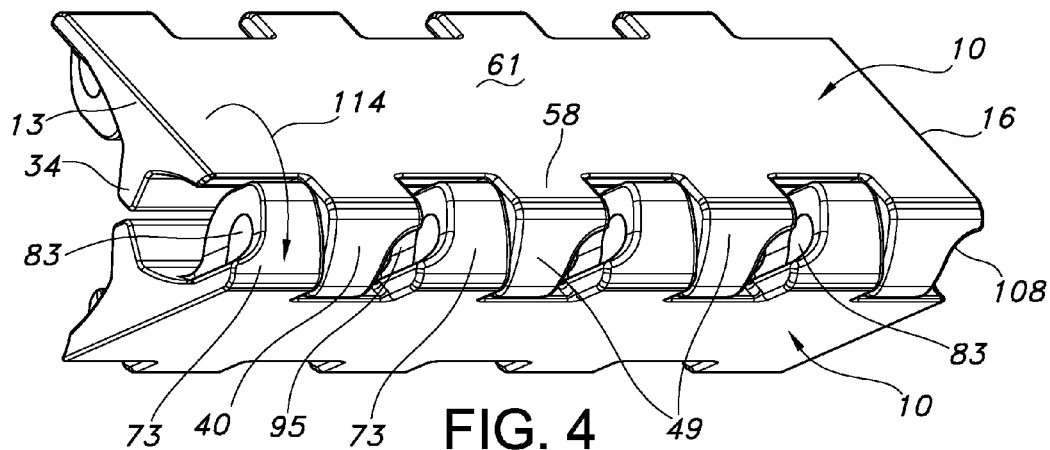
FIG. 4 is a perspective view of the modules of FIG. 2 illustrating a further step in the assembly process.
Figure 6:
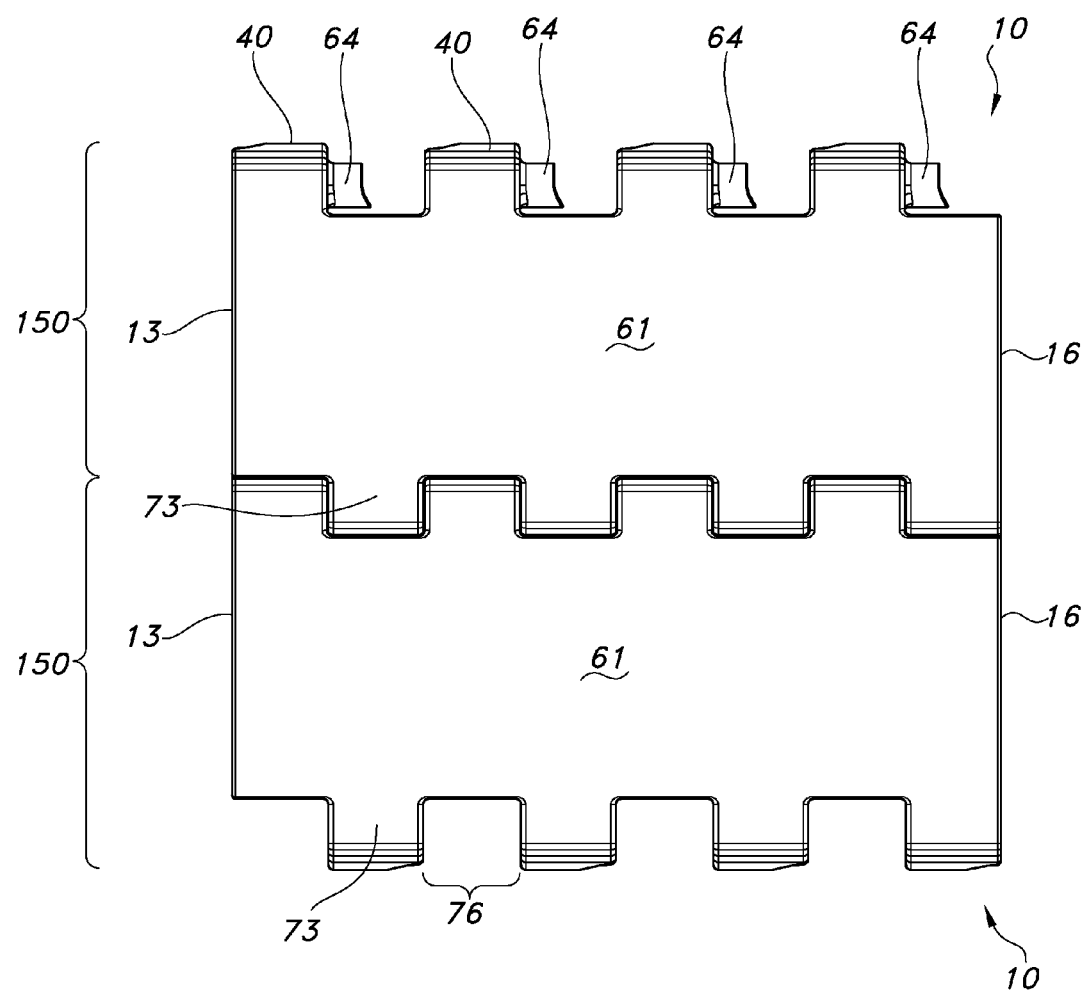
FIG. 6 is a top plan view of a portion of a belt according to the present invention.

Turning to FIG. 4, once the stud 64 is inserted into the opening 83, the module 10 is rotated about the pivot point in the direction of arrow 114 until the adjacent modules 10 form a belt with a coplanar top surface as best shown in FIG. 6.

Figure 5:
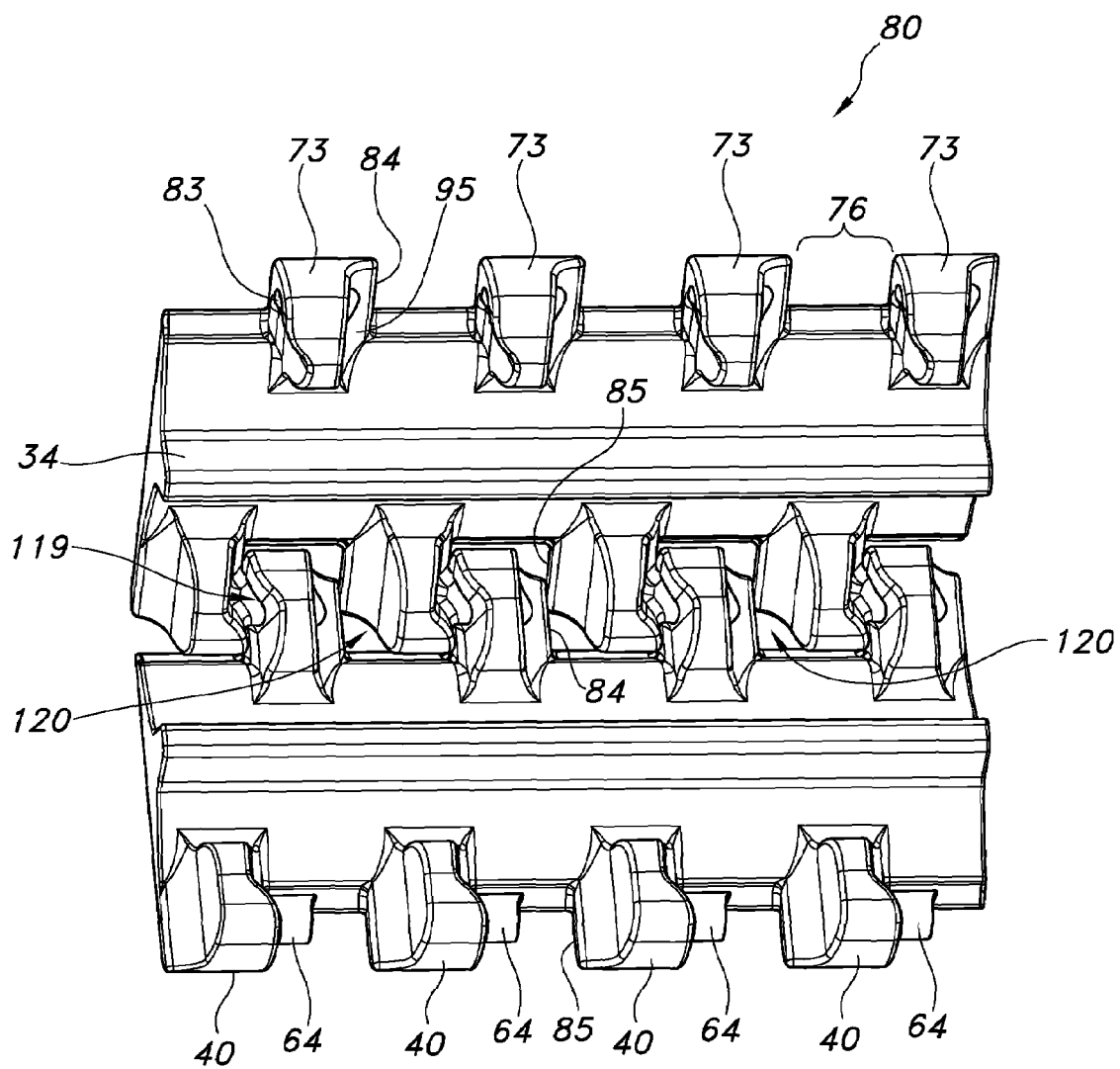
FIG. 5 is a bottom perspective view of a modular belt according to the present invention as it articulates about a sprocket.

In FIG. 5, the assembled belt 80 is shown as it traverses a sprocket (not shown). When the modules 10 are rotated into position to form a belt 80, the side edges 84, 85 of intercalated link ends 40, 73 provide an obstruction that prevents any relative lateral motion between adjacent link ends 40, 73. Accordingly, the stud 64 is prevented from moving out of the opening 83 and the adjacent modules are pivotally connected and able to rotate with respect to each other about the pivot axis established by the studs 64. As shown in FIG. 5, the curvature of the link ends 40, 73 also provides dynamic hinge gaps 119 that become larger as the belt passes over a sprocket. The dynamic hinge gaps 119 provide for better cleaning of the hinge area. Also, the design of module 10 provides large hinge openings 120 when the belt 80 passes over a sprocket.

In FIG. 6, a top view of a belt formed according to the present invention is shown. The belt is shown in a flat position with a single module 10 in each row 150. It will be evident to those of ordinary skill in the art based on this disclosure that the belt could also be formed with multiple modules per row and assembled in a bricklayed fashion.

Figure 6A:
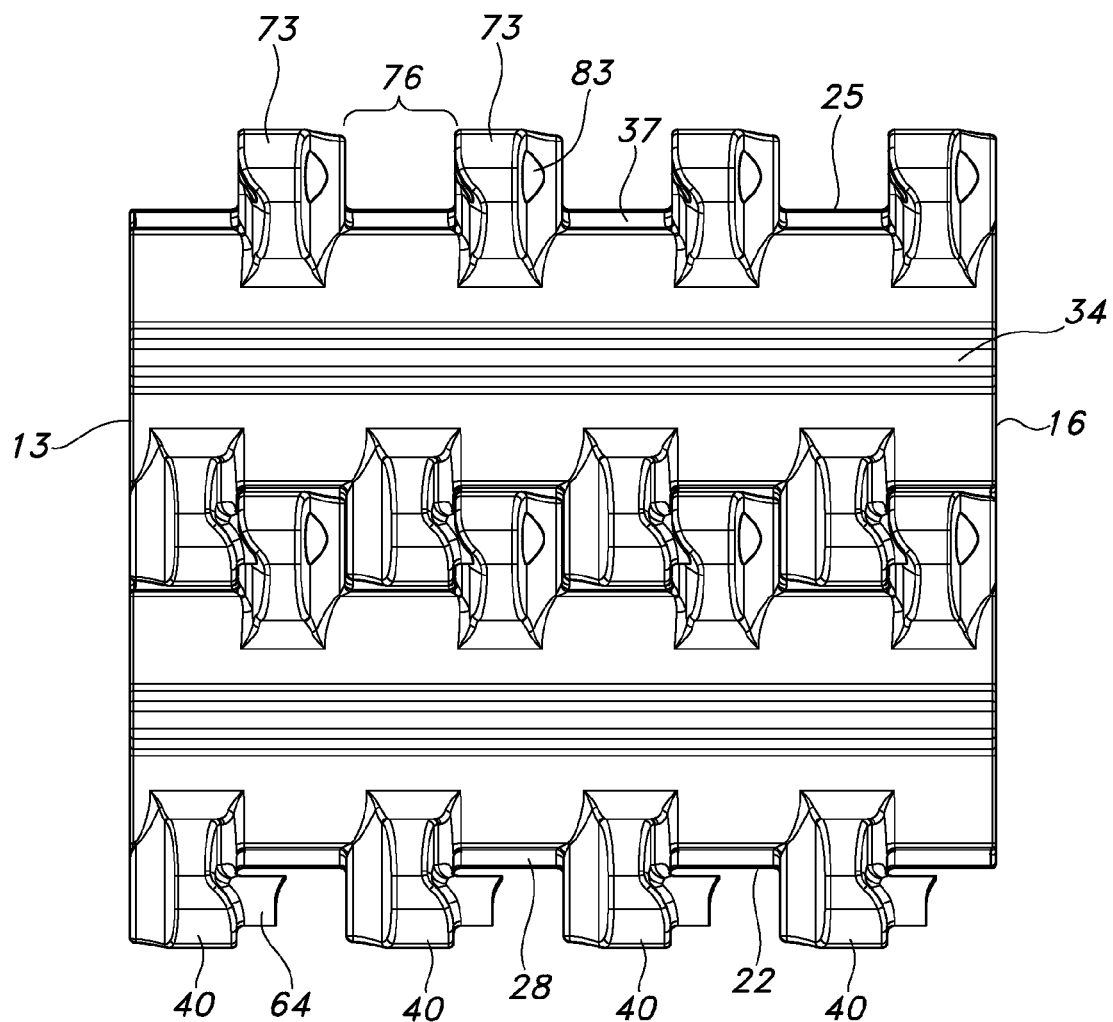
FIG. 6A is a bottom plan view of the portion of the belt shown in FIG. 6.

FIG. 6A is a bottom view of the belt shown in FIG. 6. The dynamic hinge gaps 119 are much smaller than in FIG. 5 and the gaps 120 around the hinge area are closed. The link ends 40, 73 are not capable of relative lateral movement in this position and therefore the studs 64 remain in position in openings 83.

Figure 7:
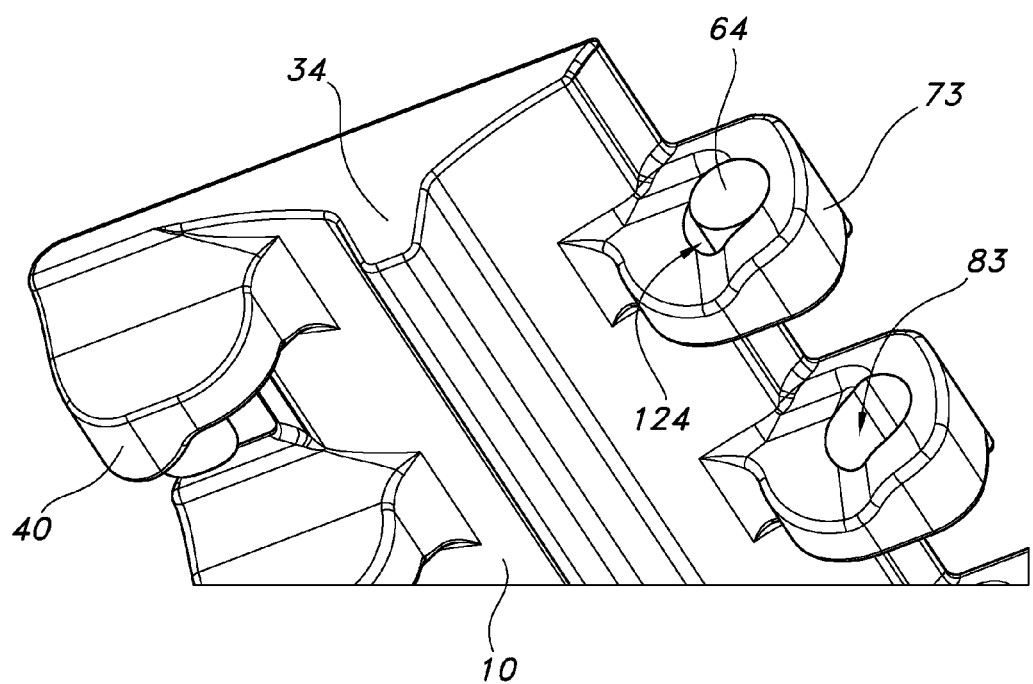
FIG. 7 is a perspective view of a portion of a module with a stud positioned in one of the openings; and, FIG. 8 is a bottom plan view of an alternate embodiment of the present invention.

Turning to FIG. 7, the openings 83 may be provided with an oblong shape to provide better access for cleaning fluids. As shown, the stud 64 may fit into a round portion of the opening 83, and the remaining portion 124 is open.

Figure 8:
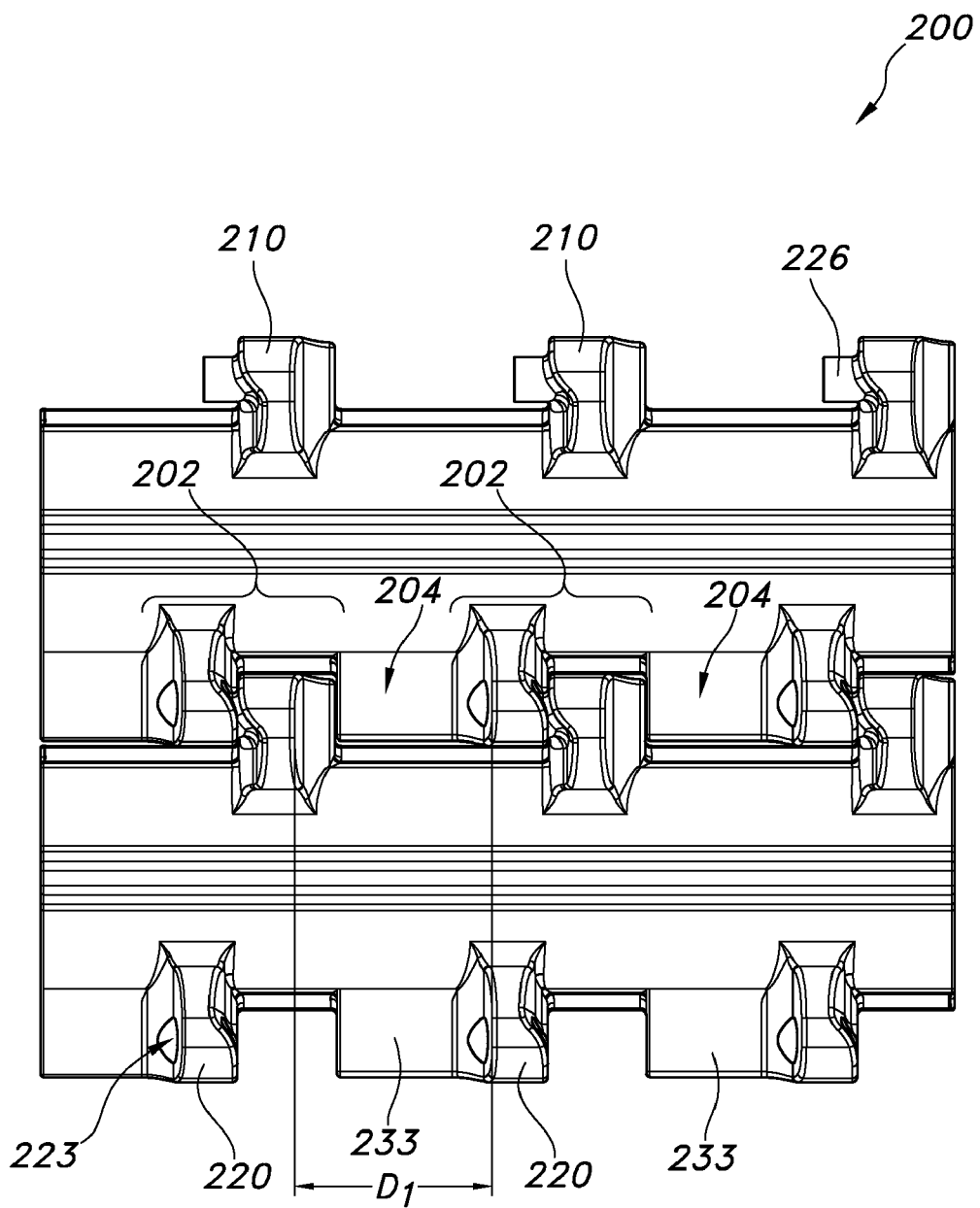

In FIG. 8, an alternate embodiment of the present invention is shown. Module 200 is intended to improve the cleanability of the belt where belt strength can be reduced. The link end pairs 202 are spaced apart by a distance D1. Increasing the space between the pairs necessarily reduces the number of link pairs 202 in a belt, which produces a free space 204 between the link pairs 202 that is easier to clean. This arrangement is particularly advantageous because, in contrast to a conventional pivot rod arrangement, the rodless design does not have a length of rod crossing the open space 204 between the link pairs 202. As shown a first plurality of link ends 210 extends in a first direction. The link ends 210 may be provided with a shape that is similar to the shape of link ends 40 which have been described in detail previously. At the opposite end of the module 200, a plurality of link ends 220 are shown. The link ends 220 have a pivot opening 223 for receiving a stud 226 on the first link ends 210. As shown toward the middle of the figure, a cover 233 extends laterally from the link end 220. The cover 233 enables the module 200 to have fewer link pairs 202 that are spread apart farther than in the other embodiment. Adjacent modules 200 are assembled in a similar fashion as described in connection with FIGS. 2-4 above. When the modules 200 are angled with respect to each other the shape of the link ends 210, 220 allows them to be intercalated and then the link end 210 with the stud 226 can be moved transversally with respect to the link end 220 having the pivot opening 223 such that the stud 226 engages with the opening 223. After the transversal movement, rotation of the modules 200 about the pivot point brings wider edges on each link end 210, 220 into engagement such that lateral movement of the link ends 210, 220 relative to each other is prevented and the stud 226 cannot disengage from the pivot opening 223.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A belt module, comprising:
   an intermediate section;
   a first plurality of link ends extending in a direction of belt travel, the first plurality of link ends having a stud extending therefrom in a direction transverse to the direction of belt travel, the first plurality of link ends having a top surface with a substantially uniform width and having a side surface with a first portion and a second portion, the first portion being wider than the second portion;
   a second plurality of link ends extending in a direction opposite to the first plurality of link ends, the second link ends being offset from the first link ends such that adjacently positioned belt modules are capable of intercalating so that the first link ends of one belt module fit into space defined between the second plurality of link ends of an adjacent belt module, the second plurality of link ends having transverse pivot openings, the second plurality of link ends having a top surface with a substantially uniform width and having a side surface with a first portion and a second portion, the first portion being wider than the second portion;
   wherein the belt module is capable of being assembled with a like adjacent module such that at a first angle the first plurality of link ends are capable of being intercalated into the spaces between the second plurality of link ends of the adjacent module and the module is capable of transversal movement with respect to the adjacent module to insert the studs into the transverse pivot rod openings and at a second angle the modules are prevented from moving far enough in the transversal direction to remove the studs from the transverse pivot rod openings.

2. The belt module of claim 1, wherein adjacent modules can be positioned at an angle to each other such that the side surface on the first plurality of link ends and the side surface on the second plurality of link ends nest in a first position to provide clearance for insertion of the first link ends into the spaces between the second link ends of an adjacent belt module.

3. The belt module of claim 1, wherein rotation of adjacent interconnected modules causes the side surface on the first plurality of link ends and the side surface on the second plurality of link ends to move into a second position such that the first and second link ends are prevented from substantial relative movement in the transverse direction.

4. The belt module of claim 1, wherein the first and second link ends have a bottom surface with a first width and a first end and a second larger width at a second end, the bottom surface of the first link ends and the second link ends of an adjacent module forming a hinge gap that becomes wider as interconnected modules traverse a sprocket.

5. The belt module of claim 1, further comprising a transverse rib disposed on a bottom surface of the intermediate section.

6. The belt module of claim 1, wherein the stud is disposed opposite from the side surface.

7. The belt module of claim 1, further comprising a cover extending from the second plurality of link ends in the transverse direction.

8. The belt module of claim 7, wherein the first plurality of link ends are intercalated with the second plurality of link ends on an adjacent module in pairs, the link pairs being disposed in spaced apart relation in the transverse direction.

9. The belt module of claim 1, wherein the stud is made from a different material than the module.

10. A modular belt, comprising:
a plurality of first belt modules having an intermediate section, a first plurality of link ends extending in a direction of belt travel, the first plurality of link ends having a stud extending therefrom in a direction transverse to the direction of belt travel, the first plurality of link ends having a top surface with a substantially uniform width and having a side surface with a first portion and a second portion, the first portion being wider than the second portion; a second plurality of link ends extending in a direction opposite to the first plurality of link ends, the second link ends being offset from the first link ends such that adjacently positioned belt modules are capable of intercalating so that the first link ends of one belt module fit into space defined between the second plurality of link ends of an adjacent belt module, the second plurality of link ends having transverse pivot openings, the second plurality of link ends having a top surface with a substantially uniform width and having a side surface with a first portion and a second portion, the first portion being wider than the second portion, wherein the belt module is capable of being assembled with a like adjacent module such that at a first angle the first plurality of link ends are capable of being intercalated into the spaces between the second plurality of link ends of the adjacent module and the module is capable of transversal movement with respect to the adjacent module to insert the studs into the transverse pivot rod openings and at a second angle the modules are prevented from moving far enough in the transversal direction to remove the studs from the transverse pivot rod openings; and,
a plurality of second belt modules having a plurality of first belt modules having an intermediate section, a first plurality of link ends extending in a direction of belt travel, the first plurality of link ends having a stud extending therefrom in a direction transverse to the direction of belt travel, the first plurality of link ends having a top surface with a substantially uniform width and having a side surface with a first portion and a second portion, the first portion being wider than the second portion; a second plurality of link ends extending in a direction opposite to the first plurality of link ends, the second link ends being offset from the first link ends such that adjacently positioned belt modules are capable of intercalating so that the first link ends of one belt module fit into space defined between the second plurality of link ends of an adjacent belt module, the second plurality of link ends having transverse pivot openings, the second plurality of link ends having a top surface with a substantially uniform width and having a side surface with a first portion and a second portion, the first portion being wider than the second portion, wherein the belt module is capable of being assembled with a like adjacent module such that at a first angle the first plurality of link ends are capable of being intercalated into the spaces between the second plurality of link ends of the adjacent module and the module is capable of transversal movement with respect to the adjacent module to insert the studs into the transverse pivot rod openings and at a second angle the modules are prevented from moving far enough in the transversal direction to remove the studs from the transverse pivot rod openings.

11. The belt module of claim 10, wherein adjacent modules can be positioned at an angle to each other such that the side surface on the first plurality of link ends and the side surface on the second plurality of link ends nest in a first position to provide clearance for insertion of the first link ends into the spaces between the second link ends of an adjacent belt module.

12. The belt module of claim 10, wherein rotation of adjacent interconnected modules causes the side surface on the first plurality of link ends and the side surface on the second plurality of link ends to move into a second position such that the first and second link ends are prevented from substantial relative movement in the transverse direction.

13. The belt module of claim 10, wherein the first and second link ends have a bottom surface with a first width and a first end and a second larger width at a second end, the bottom surface of the first link ends and the second link ends of an adjacent module forming a hinge gap that becomes wider as interconnected modules traverse a sprocket.

14. The belt module of claim 10, further comprising a transverse rib disposed on a bottom surface of the intermediate section.

15. The belt module of claim 10, wherein the stud is disposed opposite from the side surface.

16. The belt module of claim 10, further comprising a cover extending from the second plurality of link ends in the transverse direction.

17. The belt module of claim 16, wherein the first plurality of link ends are intercalated with the second plurality of link ends on an adjacent module in pairs, the pairs being disposed in spaced apart relation in the transverse direction.

18. The belt module of claim 10, wherein the stud is made from a different material than the module.

19. A method of assembling a rodless modular belt, comprising:

providing a plurality of belt modules having an intermediate section, a first plurality of link ends extending in a direction of belt travel, the first plurality of link ends having a stud extending therefrom in a direction transverse to the direction of belt travel, the first plurality of link ends having a top surface with a substantially uniform width and having a side surface with a first portion and a second portion, the first portion being wider than the second portion, and a second plurality of link ends extending in a direction opposite to the first plurality of link ends, the second link ends being offset from the first link ends such that adjacently positioned belt modules are capable of intercalating so that the first link ends of one belt module fit into space defined between the second plurality of link ends of an adjacent belt module, the second plurality of link ends having transverse pivot openings, the second plurality of link ends having a top surface with a substantially uniform width and having a side surface with a first portion and a second portion, the first portion being wider than the second portion;

placing a first module adjacent to a second module such that the intermediate sections form an acute angle;

juxtaposing the first and second module such that the first plurality of link ends of a first module are intercalated with the second plurality of link ends of an adjacent module;

aligning the studs on the first link ends with the transverse openings on the second link ends of the adjacent module;

moving the first link ends transverse relative to the second link ends such that the studs enter the transverse openings;

rotating the first module relative to the second module about the pivot point established by the studs such that the side surface on the first plurality of link ends and the side surface on the second plurality of link ends move into a position such that the first and second link ends are prevented from substantial relative movement in the transverse direction to prevent the studs from exiting from the transverse pivot openings.

20. The method of claim 19, wherein the stud is made from a different material than the module.

* * * * *